(12) United States Patent
Zhang et al.

(10) Patent No.: US 10,366,171 B1
(45) Date of Patent: **\*Jul. 30, 2019**

(54) OPTIMIZING MACHINE TRANSLATIONS FOR USER ENGAGEMENT

(71) Applicant: Facebook, Inc., Menlo Park, CA (US)

(72) Inventors: Ying Zhang, Palo Alto, CA (US); Fei Hung, Chatham, NJ (US); Kay Rottmann, Hainbuchenweg (DE); Necip Fazil Ayan, Menlo Park, CA (US)

(73) Assignee: FACEBOOK, INC., Menlo Park, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/144,227

(22) Filed: Sep. 27, 2018

Related U.S. Application Data

(63) Continuation of application No. 15/192,109, filed on Jun. 24, 2016, now Pat. No. 10,114,819.

(51) Int. Cl.
*G06F 17/20* (2006.01)
*G06F 17/28* (2006.01)
*G06Q 50/00* (2012.01)

(52) U.S. Cl.
CPC ........ *G06F 17/2854* (2013.01); *G06F 17/289* (2013.01); *G06Q 50/01* (2013.01)

(58) Field of Classification Search
CPC .... G06F 17/2854; G06F 17/289; G06Q 50/01
USPC .................................. 704/2, 4, 8, 9, 10, 277
See application file for complete search history.

(56) References Cited

U.S. PATENT DOCUMENTS 8,756,050 B1\* 6/2014 Harkness .............. G06F 17/289
704/1
10,114,819 B2\* 10/2018 Zhang ................ G06F 17/2854

\* cited by examiner

*Primary Examiner* — Thierry L Pham

(57) ABSTRACT

Exemplary embodiments relate to techniques for improving a machine translation system. The machine translation system may include one or more models for generating a translation. The system may generate multiple candidate translations, and may present the candidate translations to different groups of users, such as users of a social network. User engagement with the different candidate translations may be measured, and the system may determine which of the candidate translations was most favored by the users. For example, in the context of a social network, the number of times that the translation is liked or shared, or the number of comments associated with the translation, may be used to determine user engagement with the translation. The models of the machine translation system may be modified to favor the most-favored candidate translation. The translation system may repeat this process to continue to tune the models in a feedback loop.

20 Claims, 9 Drawing Sheets

OPTIMIZING MACHINE TRANSLATIONS FOR USER ENGAGEMENT

CROSS-REFERENCE TO RELATED APPLICATIONS

This application is a continuation of and claims the benefit of priority to U.S. Pat. No. 10,114,819, titled "OPTIMIZING MACHINE TRANSLATIONS FOR USER ENGAGEMENT," filed on Jun. 24, 2016, which is hereby incorporated by reference in its entirety.

BACKGROUND

Machine translations involve the translation of information from a source language to a destination language via a computing device. Machine translations may be used to translate, for example, advertisements, government documents, academic works, text messages and emails, social networking posts, recordings of spoken language, and numerous other works.

There may be more than one possible way to translate a word, phrase, or sentence into the destination language. Although each of these possible translations may be correct in certain circumstances, some translations may not make sense in the context of the full translation. For example, assume that the phrase "very good" is translated into German. The word "very" is typically translated as "sehr." However, the word "good" may be translated in different ways depending on the way that it is used. For example, the "good" in "good morning" is typically translated as "guten," whereas the "good" in "that food is good" may be translated as "gut." In this case, both "gut" and "guten" are reasonable translations of the word "good," but "sehr gut" is a more preferable translation than "sehr guten."

Thus, multiple different translations may be generated for given source material. However, some possible translations may be more correct or more favored than others. Identifying which translations are favored and communicating this information in a way that a machine translation system can consistently apply can be a difficult and time-consuming process.

One traditional technique for improving a machine translation involves the use of the Bilingual Evaluation Understudy (BLEU) score. In this technique, a segment such as a sentence of phrase is translated by a machine into a destination language. The machine-generated translation is compared to one or more reference translations, typically good-quality translations prepared by a human. A score between 0 and 1 is assigned to the machine translation based on how well it approximated the human translation. When training a translation model for a machine translation system, the translation model may be evaluated in view of the BLEU score calculated over multiple translations, and modified to improve its BLEU-score-based performance.

The BLEU score remains the industry standard in evaluating machine translations. However, several problems exist with techniques that rely on the BLEU score. One problem with the use of the BLEU score is that it can be expensive to run evaluations. In order to accommodate different translations that are nevertheless correct, multiple reference translations may be used. Because each reference translation is typically generated by a human, producing these reference translations can be expensive and time-consuming. Moreover, there are questions as to how well the BLEU score measures translation quality. Among other issues, the BLEU score may not accurately capture whole sentence-level meaning, does not address grammatical correctness, and has difficulty evaluating translations involving languages that lack clear word-level boundaries.

SUMMARY

Exemplary embodiments provide methods, mediums, and systems for improving machine translations. According to exemplary embodiments, a machine translation system may receive source information in a source language $L_a$. The translation system may apply one or more models, such as a translation model and a language model, in order to generate a plurality of possible translations of the source information into a destination language $L_b$.

The translation system may access a population of users, such as users of a social network. The population may be divided into multiple groups, where each group receives one of the possible translations. Each user's or group's engagement with the translation may be measured, where engagement refers to the ways, positively or negatively, that the user or group interacts with the translation. In the above example involving users of a social network, for instance, different translations may be surfaced to different groups of users as different forms of a translated article, post, or other type of content. Users may interact with the translations by clicking-through to read the article, "liking" a post, etc.

The models applied by the translation system may include one or more scores or parameters that are used to determine which words, phrases, sentences, etc. in the destination language $L_b$ correspond to the source information. The translation system may analyze the user interactions to determine which translation received more user engagement (and/or more positive user engagement). If one translation receives more user engagement than another, this may be used as an indication that the first translation was favored or a better translation. Thus, based on the measured user interaction, the translation system may modify the scores or parameters of the models in order to favor the translation having the higher user engagement. Thus, the models will be more likely to produce translations similar to the one that received greater engagement.

This procedure may be repeatedly applied in order to create a feedback system in which multiple candidate translations are generated using a model, the translations are evaluated for user engagement, the model is modified to favor the translation having greater positive engagement, the updated model generates multiple candidate translations, and the process repeats.

These and other features and advantages will be described in more detail with reference to the attached drawings.

DETAILED DESCRIPTION

Exemplary embodiments relate to techniques for improving a machine translation system by indirectly measuring the correctness of a translation through user interaction with the translation. Rather than comparing the translation to a human-generated translation and generating a score (such as the above-described BLEU score), exemplary embodiments distribute multiple different candidate translations to different groups of users, and then measure user engagement with the different candidate translations to determine which one is the most favored.

The users may be users of a social network. The users may interact with the translations, such as by commenting on articles or posts including translated material, liking an article or post including translated material, or sharing an article or post including translated material, among other possibilities. Metrics may be tracked to measure user interaction, and the metrics may be provided to the translation system. In some embodiments, users may provide more direct feedback, such as by answering a prompt asking whether a translation is usable or understandable.

The translation system may determine which of the candidate translations was the most favored translation based on the metrics, and may modify the translation system in order to favor the most favored translation. For example, the translation system may include one or more models that are applied to generate translations, and the models may include one or more parameters or scores that determine how given source material will be translated. The machine translation system may modify the parameters or scores so that the system is more likely to generate translations similar to the most-favored candidate translation.

This process may be repeated in a feedback loop. Specifically, after updating the models, the translation system may apply the updated models to generate new candidate translations, new engagement information may be generated, and the new translations may be evaluated to determine which is the most favored. The model may then be further updated in view of the new engagement information.

Figure 1A:
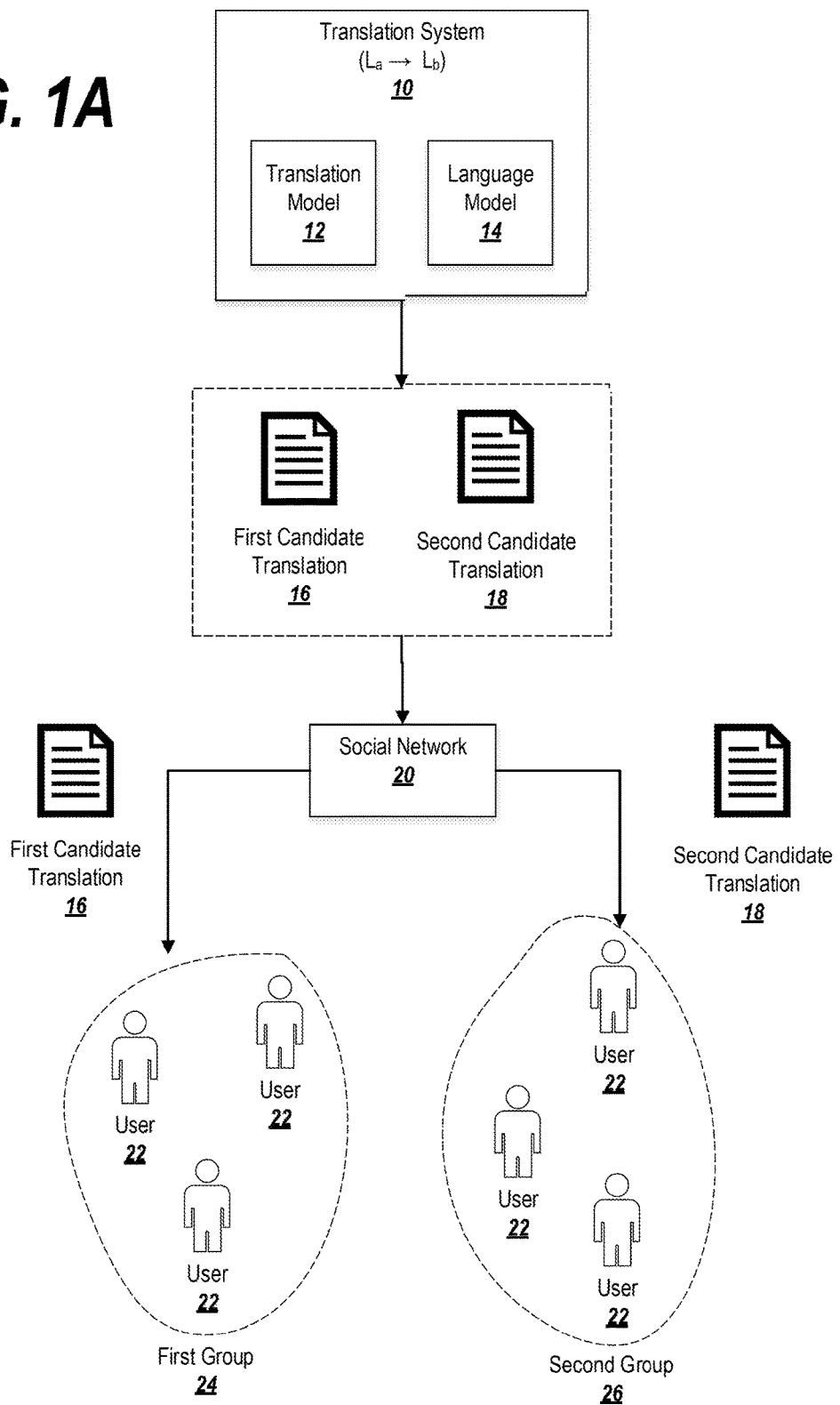
FIGS. 1A-1B depict a simplified overview of an exemplary system for improving translation models based on user interaction with candidate translations.
Figure 1B:
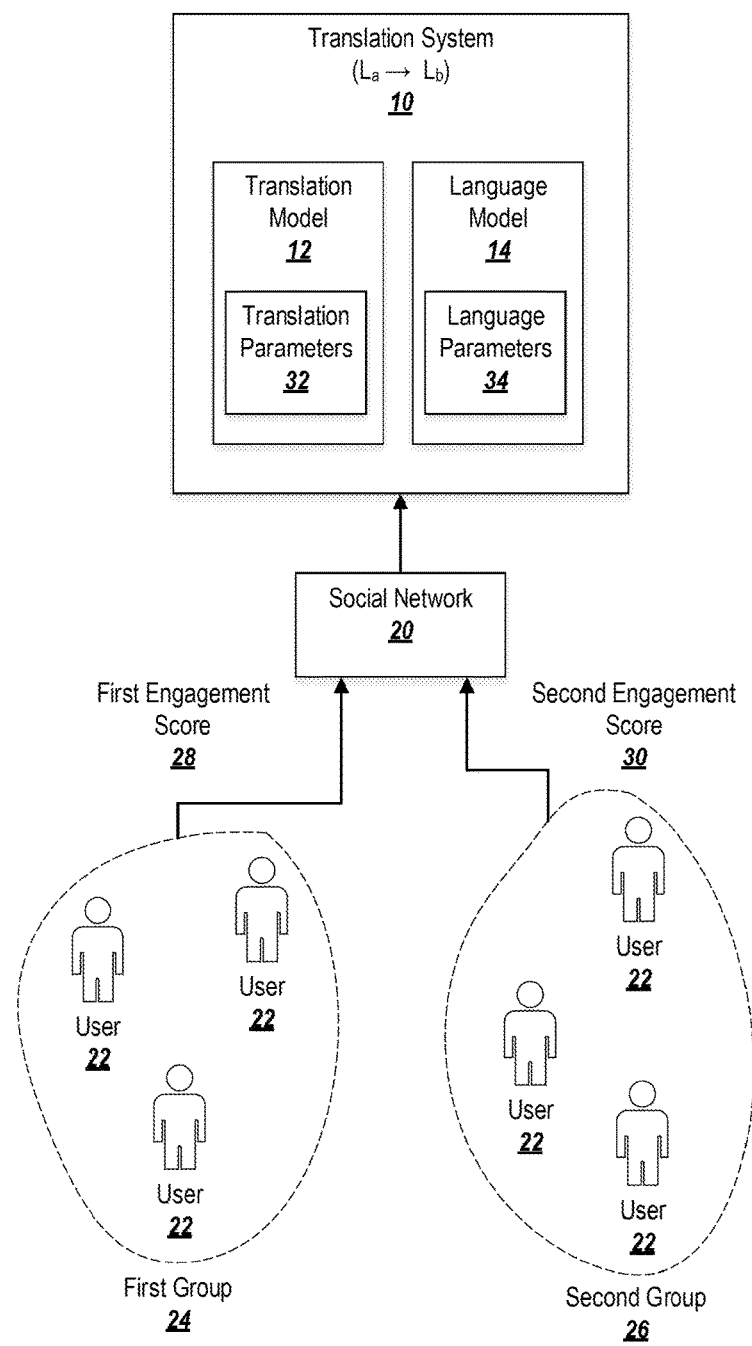

By way of illustration, FIGS. 1A and 1B depict an example in which a machine translation system is modified based on user engagement with candidate translations. As shown in FIG. 1A, a translation system 10 includes a translation model 12, which is applied to translate an input in a source language ($L_a$) into an output in a destination language ($L_b$). More specifically, the translation model 12 receives one or more words, phrases, etc. in the source language $L_a$ and generates a list of hypotheses that represent possible translations of the source language material into the destination language $L_b$.

The translation system 10 also includes a language model 14, which selects between the different hypotheses to determine, in the context in which the hypotheses occur, which of the hypotheses is the more likely translation of the source material.

According to exemplary embodiments, the translation system 10 may apply the translation model 12 and the language model 14 to generate n candidate translations (representing, e.g., the n translations that are the highest-rated by the translation model 12 and/or the language model 14). In the example of FIG. 1A, n=2. This results in a first candidate translation 16 and a second candidate translation 18.

The candidate translations are provided to a group of users, such as users 22 of a social network 20. In this case, the first candidate translation 16 is provided to a first group 24, while the second candidate translation 18 is provided to a second group 26. The translations may be surfaced to the users 22 of the social network 20. For example, the social network 20 may provide a news feed or other list of content which is presented to the users 22. In the news feed or list of content, the first group 24 may see the first candidate translation 16, whereas the second group 26 may see the second candidate translation 18.

Turning to FIG. 1B, the first group 24 may interact with the first candidate translation 16, while the second group 26 may interact with the second candidate translation 18. These interactions might include, for example, commenting on a post containing the respective candidate translations, sharing the candidate translations, or liking the candidate translations. The users 22 may also be asked to directly evaluate the translation. For example, the users 22 may be asked whether the translation is useable or understandable. The social network 20 may record metrics based on these interactions, and the metrics may be used to generate a first engagement score 28 and a second engagement score 30.

It is noted that, although FIG. 1B shows the local devices of the user 22 generating the respective engagement scores 28, 30 and sending the engagement scores to the social network 20, the engagement scores could be calculated at the social network 20 and sent to the translation system 10, or could be calculated at the translation system 10. To that end, the metrics may be provided to the social network 20 or to the translation system 10. Moreover, the social network 20 may receive the metrics and/or the engagement scores, and may use this information to rank the candidate translations based on which was the most interacted-with translation. The social network 20 may send the ranking, or an indication of the most interacted-with translation, to the translation system 10.

Using this information, the translation system 10 may determine which of the candidate translations was the most-favored translation. For example, if the users 22 liked or shared the first candidate translation 16 more than the second candidate translation 18, this may indicate that it was easier to understand the first candidate translation 16. Thus, in this example the first candidate translation 16 was the most favored translation among the users 22.

The translation system 10 may be modified based on which translation was the most favored, so that the translation system 10 is more likely to generate translations similar to the most favored translation in the future. For example, the translation model 12 may make use of one or more translation parameters 32, while the language model 14 makes use of one or more language parameters 34. The parameters 32, 34 may represent one or more scores, model weights, etc. that affect which of multiple possible translations are selected. The translations system 10 may modify one or more of these parameters so that the translation model 12 and/or the language model 14 are more likely to select the words or phrases that were used in the more favored candidate translation.

When another translation is requested of the translation system 10, the translation system 10 may apply the updated translation model 12 and the updated language model 14. The above-described process may be repeated in order to further fine-tune the translation system 10, thus creating a feedback loop in which the models 12, 14 are continually improved and used to generate new candidate translations.

These and other features of exemplary embodiments are described in more detail below. Before further discussing the exemplary embodiments, however, a general note regarding data privacy is provided.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Next, an overview of the machine translation system is provided.

Machine Translation System

Figure 2:
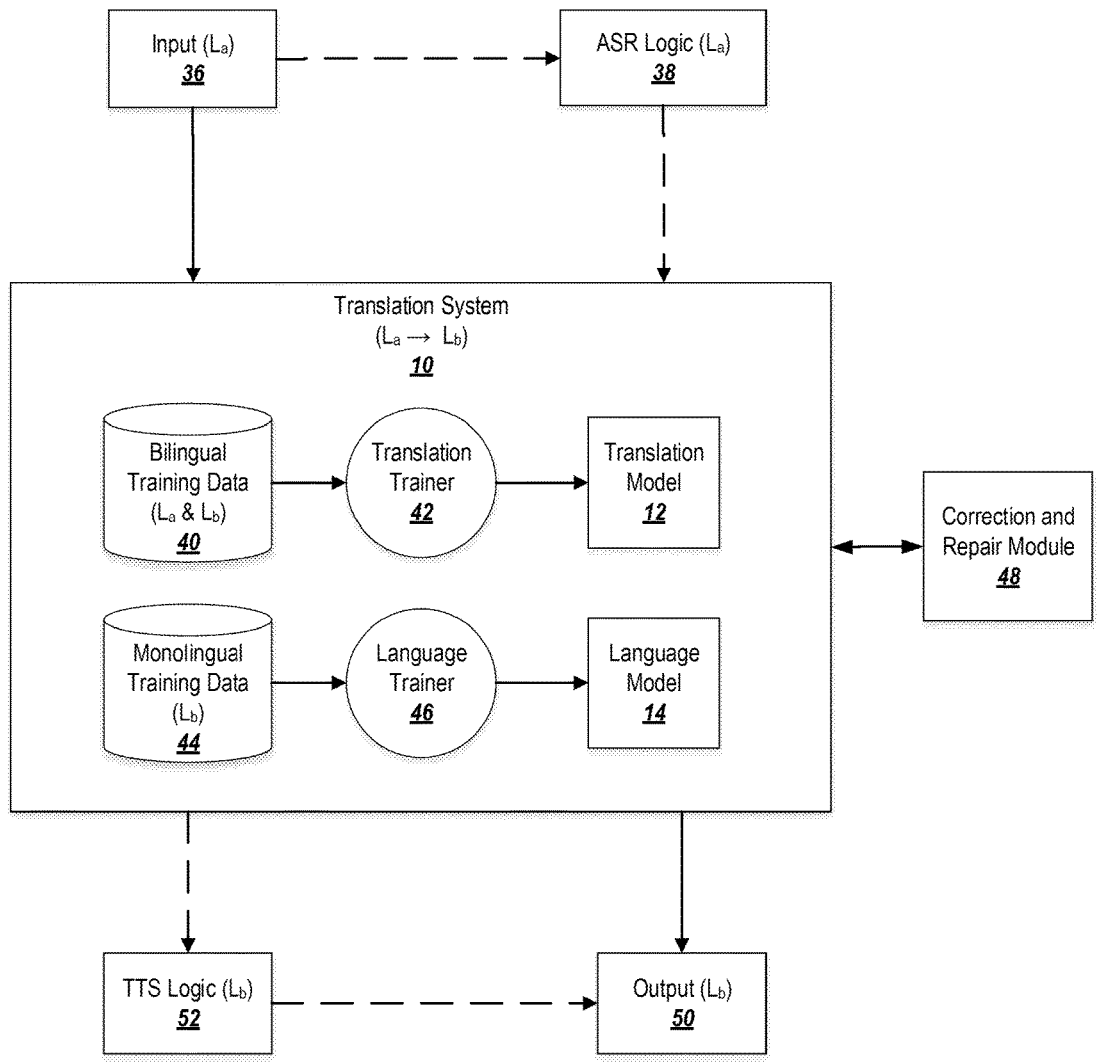
FIG. 2 is a block diagram illustrating a translation system constructed according to an exemplary embodiment.

FIG. 2 is a block diagram overview of an example of a translation system suitable for use with exemplary embodiments. FIG. 2 depicts a unidirectional system in which a translation is performed from $L_a$ to $L_b$; however, the present invention is not so limited. The translation system may be bidirectional, performing translation in both directions (from $L_a$ to $L_b$, and from $L_b$ to $L_a$). Moreover, a multi-directional system involving several languages $L_1 \ldots L_n$ could equally benefit from the present invention.

An input 36 may be provided to the machine translation system. The input 36 may be in the form of text in the source language $L_a$, such as text input from a keyboard via a web browser or application. The input 36 may also take other forms, such as an audio recording, writing provided directly to a computing system through a stylus or electronic pen, writing indirectly provided to a computing system (e.g., by scanning a handwritten or typed document), a photograph (e.g., a photograph of a sign), and other suitable types of input. In order to provide the input 26, a user may interact with the system via a graphical user interface displayed on a computing device screen (or active touch screen), a pointing device such as a mouse or pen, a microphone, and/or a keyboard.

In some embodiments, the translation system 10 is operable to translate textual information from the source language $L_a$ to the destination language $L_b$. Accordingly, in order to handle multiple different types of inputs 36, logic may be provided for converting the input 36 into text. For example, FIG. 2 depicts automatic speech recognition (ASR) logic 38 that is configured to convert input audio in the source language $L_a$ into text in the source language $L_a$. In order to convert an audio recording to text, the ASR logic may utilize an acoustic model, an ASR class-based language model, and a recognition lexicon model. One example of suitable ASR logic is the "Ninja" speech recognizer system developed at Mobile Technologies, LLC. Other types of ASR logic that may be used include speech recognizers developed by IBM Corporation, SRI, BBN, Cambridge, or Aachen.

Other types of logic may be provided for other types of inputs 36 (e.g., optical character recognition logic for converting input handwriting or typing, image analysis logic for converting input photographs, etc.). If the translation system operates on something other than text (e.g., audio), suitable logic may be provided for converting the input 36 into a format recognizable to the translation system.

The input 36 is provided to a translation system 10 (potentially after being processed by the ASR logic 38 or other suitable logic). The translation system 10 is configured to translate the input 36 from the source language $L_a$ into the destination language $L_b$. Examples of translation systems 10 suitable for use with exemplary embodiments include the "PanDoRA" system developed at Mobile Technologies, LLC, as well as machine translation systems developed by IBM Corporation, SRI, BBN or at Aachen University.

Generally, the translation system 10 applies a translation model 12 to source language words, phrases, sentences, etc. in the input 36 in order to develop a list of plausible candidate destination language words, phrases, sentences, etc. that may represent a translation of the source language material. The list of candidate destination language words, phrases, sentences, etc. are referred to as translation hypotheses. After generating a list of hypotheses, the list may be subjected to further analysis by a language model 14. The language model 14 considers the context in which the hypotheses are used in the destination language $L_b$, and selects one of the hypotheses as the most likely translation of the source material.

The translation model 12 may be, for example, a phrase table with entries for each hypothesis. Each entry may include a source language word, phrase, sentence, etc. and a paired destination language word, phrase, sentence, etc. Each entry may be associated with a score that represents the likelihood, in general, that the destination language portion of the pair is the translation of the source language portion of the pair. For illustration purposes, an example of a phrase table is shown in Table 1, below.

TABLE 1

| Source Material | Destination Material | Score |
|---|---|---|
| Good | Gut | 0.7 |
| Good | Guten | 0.5 |
| Good | Heiligmäßig | 0.1 |

The source/destination pairs in the phrase table may be generated from bilingual training data 40. The bilingual training data 40 may include words, phrases, sentences, etc. that have been previously translated from the source language $L_a$ to the destination language $L_b$ (or vice versa). The score in the phrase table may represent a frequency at which the source/destination pairs were found to correspond to each other in the bilingual training data 40. A translation trainer 42 include logic to analyze the bilingual training data 40 and create or modify entries in the phrase table based on the analysis.

As noted above, the translation model 12 produced by the translation trainer 42 may be well-suited to generating an initial list of hypotheses indicative or possible translations for the source material. However, the translation model 12 typically does not take context into account. For example, Table 1 above shows that, in general, the word "Good" was translated into "Gut" slightly more often than it was translated into "Guten;" nonetheless, both are reasonably plausible hypotheses. Thus, without any context, it may be difficult to determine which translation is the most likely. However, assume that the previous word was translated as "Sehr" ("Very"). In German, it is much more likely that the word after "Sehr" should be translated as "Gut," rather than "Guten." In order to take this information into account, a language model 14 provides one or more tuning scores that allow the initial phrase table score to be supplemented or replaced in view of the words and phrases surrounding a particular candidate hypothesis. When presented with new information for translation, the translation system 10 may generate an initial list of hypotheses using the translation model 12, and then may select the most likely translation from among the list of hypotheses using the tuning scores provided by the language model 14.

The language model 14 used to translate a source language $L_a$ into a destination language $L_b$ is a language model 14 for the destination language $L_b$. The language model 14 may be trained using monolingual training data 44 for the destination language $L_b$. The monolingual training data 44 may be any suitable list of words, phrases, sentences, etc. from the destination language $L_b$. For example, the monolingual training data 44 may include publications, articles, or literature from the destination language $L_b$, and/or may include text collected from various sources (e.g., social networking posts, assuming that the author's privacy settings allow for the collection of such data). A language trainer 46 may include logic configured to analyze the monolingual training data 44 and to generate one or more tuning scores based on the occurrence of words, phrases, etc. based on their placement with respect to one another.

In some embodiments, a correction and repair module 48 employing correction logic may be provided. The correction and repair module 48 allows the user to correct the translation system 10 output via multiple modalities; including speech, gesture, writing, tactile, touch-sensitive and keyboard interfaces, and enables the system to learn from the user's corrections. The correction and repair module may be of the type such as that disclosed in U.S. Pat. No. 5,855,000.

User field customization logic may provide an interface for users to add new vocabulary to the system, and can also select an appropriate system vocabulary for their current situation. For example, a change in system vocabulary may be triggered by a change in location, as determined by the UPS coordinates indicating the current location of the user's device, or an explicit selection of task or location by the user.

The Correction and Repair Module 48 records and logs any corrections the user may make, which can be later used to update ASR logic 38 and translation system 10. If the correction contains a new vocabulary item, or if the user enters the field customization mode to explicitly add a new word to the system, or if a new word is automatically detected in the input audio using confidence measures or new word models, such as the method described in Thomas Schaaf, "Detection of OOV words using generalized word models and a semantic class language model," in Proc. of Eurospeech, 2001, the new vocabulary item or word may be added to the translation model 12 and/or the language model 14.

After applying the translation model 12 and/or the language model 14 to the input 36, the translation system 10 may generate an output 50 in the destination language $L_b$. The output 50 may be in a textual format and may be presented on a display device. In some embodiments, the output 50 may be automatically presented (e.g., an automatic translation or "autotranslation"). In other embodiments, a prompt may be presented and the user may request that the translation be shown. The translation may remain hidden until the user manually requests that the translation be presented.

If it is desirable to provide the output 50 in a format other than text, then logic may be employed for converting the output 50 into the desired format. For example, FIG. 2 depicts text-to-speech (TTS) logic 52 for converting the text generated by the translation system 10 into an audio recording. The TTS logic 52 generates audio output for an output device, such as a speaker. Examples of suitable TTS logic 52 include the Cepstral TTS module was used. Other TTS modules, such as TTS modules which support Windows SAPI (speech application programming interface) conventions, could also be employed.

Model Training and Updating

Figure 3:
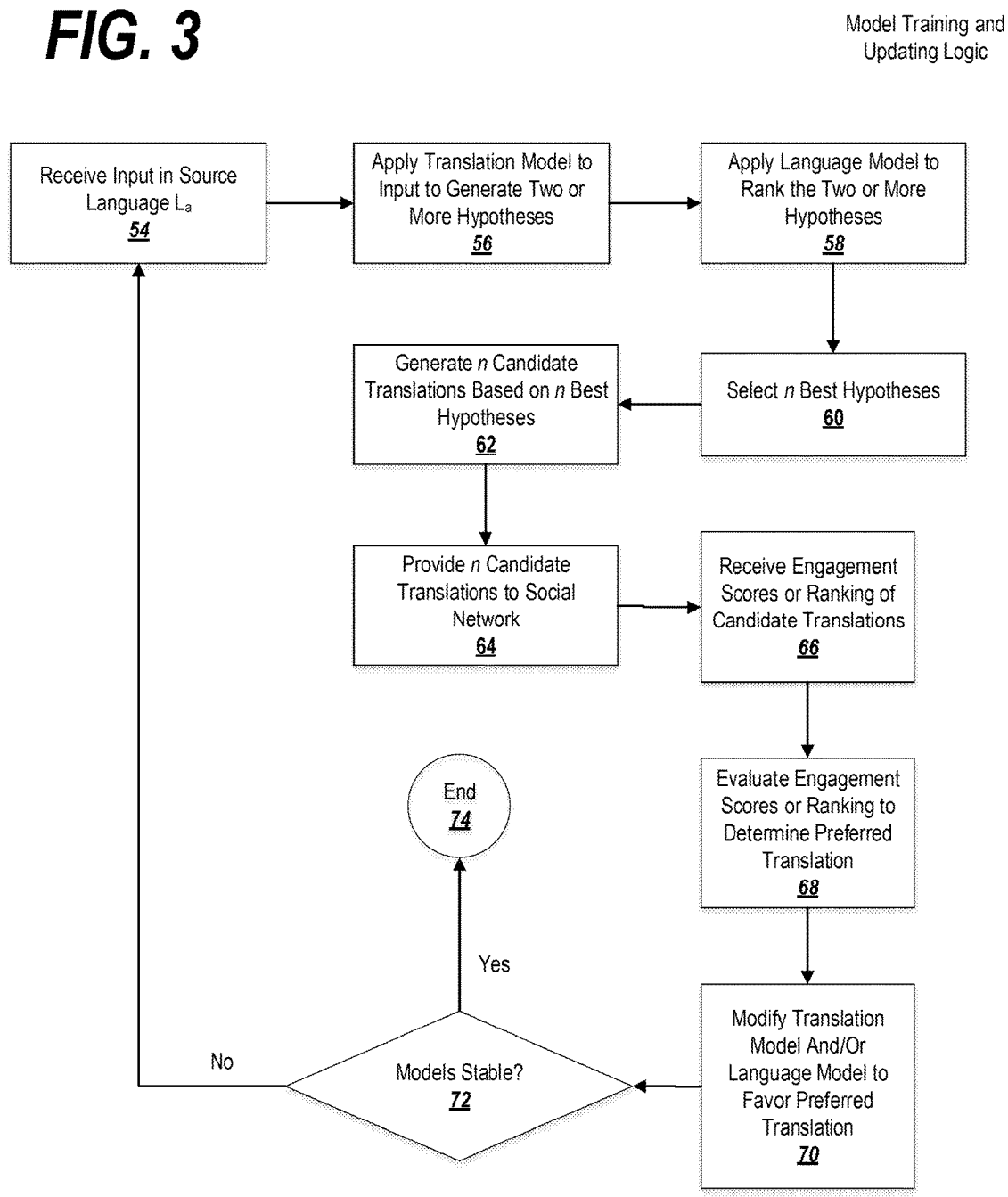
FIG. 3 is a flowchart depicting an exemplary process for improving translation models based on user interaction with candidate translations

FIG. 3 depicts an exemplary process for improving translation models based on user interaction with candidate translations. The procedure depicted in FIG. 3 may be applied as model training and updating logic including computer-executable instructions. The instructions may be executed by one or more trainers, such as the translation trainer 42 and/or the language trainer 46.

The procedure begins at step 54, where the translation system 10 receives an input in a source language $L_a$. The input may be received as part of a request from a social network that a translation of the input into a destination language $L_b$ be generated. However, even in embodiments in which a social network is employed to measure user engagement with translations, the original input need not necessarily originate in a social network.

At step 56, the translation system 10 may apply a translation model 12 to the input, in order to generate two or more hypotheses in the destination language $L_b$ that represent translated words, phrases, etc. from the input. For example, the translation system 10 may retrieve a phrase table (Table 1, above) from memory, where the phrase table includes pairs of words, phrases, etc. One member of the pair may represent a word, phrase, etc. in the source language $L_a$ and one member may represent a word, phrase, etc. in the destination language $L_b$ The destination-side word, phrase, etc. may represent a hypothesis for a translation of the source-side word, phrase, etc. into the destination language $L_b$.

The translation model 12 may include one or more scores or other parameters that indicate a likelihood, in general, that the source-side of the pair is translated into the destination-side of the pair. The translation model may select the h most-likely phrase table entries that represent possible translations of the source material. h may represent any integer greater than one, and the specific number may be varied depending on the application.

At step 58, the h most-likely hypotheses may be sent to the language model 14, which may rank the h hypotheses based on tuning scores or other parameters used by the language model 14. The language model 14 considers how the destination words, phrases etc. are used in the broader context of the translated material, and is generally used to select the single most likely word, phrase, etc. that represents the translation of the source material into the destination language $L_b$. In contrast, in exemplary embodiments the language model 14 selects the n most likely hypotheses at step 60, and generates n candidate translations (one for each hypothesis) at step 62. n may represent any integer greater than one, and the specific number may be varied depending on the application.

In some cases, the n candidate translations may differ based on a single word or phrase (e.g., each differing based on only a single different entry in the phrase table). In other embodiments, the n candidate translations may differ in multiple words or phrases (e.g., each employing multiple different phrase table entries). In this case, the analysis of user engagement may take into account the multiple different selections that went into the n candidate translations (e.g., comparing user engagement across multiple sets of variables to isolate which variable or variables was most responsible for the user engagement score, and/or determining whether two or more variables interacted with each other).

At step 64, the translation system 10 may cause the n candidate translations to be provided to a group of users. In one embodiment, the n candidate translations are provided to a social network for distribution to different groups of social network users. The n candidate translations may be surfaced to the different groups (e.g., by displaying the different translations in the users' news feeds).

At step 66, the translation system 10 may receive interaction metrics, engagement scores, or a ranking of the n candidate translations from the social network. Based on the received information, at step 68 the translation system 10 may determine which of the n candidate translations was the most-favored translation. In some embodiments, the translation system 10 may identify multiple favored translations.

For example, the translation system 10 may receive metrics such as a number of likes, a number of shares, and/or a number of comments assigned to each translation. The translation system may add these metrics together and/or may weigh the value assigned to each of the metrics to generate an engagement score.

Furthermore, users may be asked to directly evaluate a translation's quality. The present inventors have learned that asking a user to "rate" a translation often yields inconsistent results, because a user may not know on what basis they should be rating the translation. Moreover, different users will apply different rating scales. Instead, it has been found that asking a user whether a translation was "useable" or "understandable" produced more consistent and more useful results. Such a user-generated understandability rating may be considered along with the other metrics.

Optionally, the metrics may include data indicating demographic information for the user that generated the metric (e.g., the metrics may indicate the age, gender, nationality, etc. of a user that shared, liked, or commented on the translation). Different engagement scores may be calculated for different target groups. This may allow for multiple different models 12, 14 to be generated, one for each demographic group of interest. As a result, different translations may be generated based on the language patterns of different demographic groups, and an appropriate translation may be provided based upon an identity of a user requesting the translation, or a target group identified in the translation request.

The metrics may be normalized depending on the demographic group based on the demographic group's language capabilities or preferences. For example, a demographic group containing young people may be more tolerant of poor translations than a demographic group including older people. Similarly, a demographic group of non-native destination-language speakers may be less tolerant of poor translations than a demographic group of native destination-language speakers.

At step 68, the engagement scores or rankings may be evaluated to determine one or more favored translations from among the candidate translations. For example, the candidate with the highest engagement score may be selected as the favored translation, or the 2, 3, or more highest-ranked candidates may be selected.

At step 70, the translation system 10 may modify the translation model 12 and/or the language model 14 to favor the favored translation(s). For example, the translation system 10 may identify one or more phrase table entries that were applied to generate the favored translation(s) that were not applied in the non-favored translation(s). The translation system 10 may increase the scores or parameters from these entries, or may alter the tuning scores applied by the language model 14, to increase the likelihood that these entries will be selected in the future. The translation system 10 may also (or as an alternative) decrease the scores of non-favored entries. The updated model(s) may be stored in memory and may replace a previous version of the model.

At step 72, the translation system 10 may determine whether the translation model 12 and/or the language model 14 have entered a stable state. For example, if the parameters modified at step 70 were changed by less than a predetermined threshold amount (possibly over the course of several loops through the process of FIG. 3), then the models may be considered to be stable and further tuning is not required. Thus, at step 74, processing may end.

If it is determined at step 72 that the models have not entered a stable state, then processing may return to step 54, and new candidate translations may be generated by the updated models. The new candidate translations may be evaluated for user engagement and used to further refine the models.

Measuring User Engagement

Figure 4:
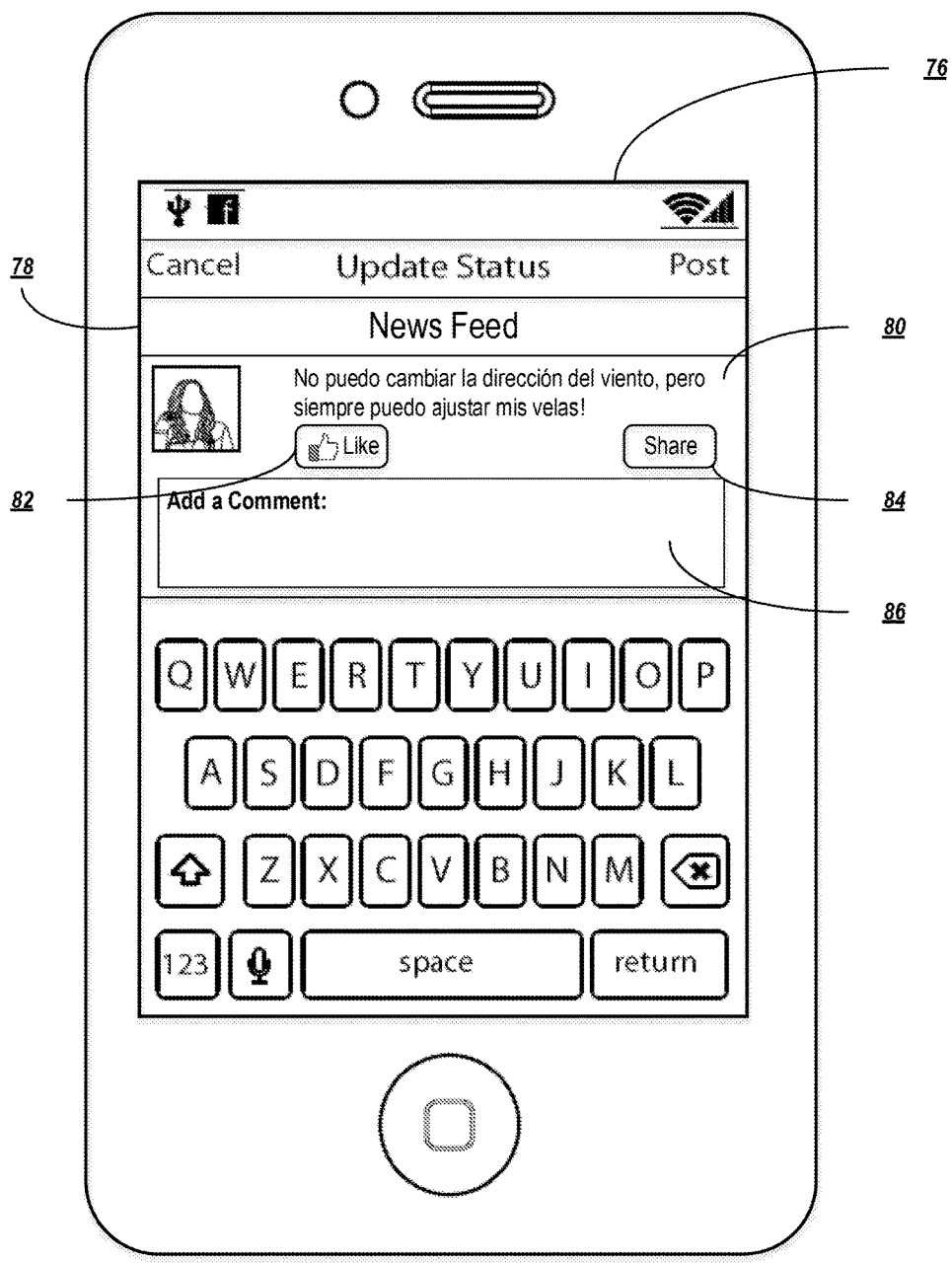
FIG. 4 is an example of a user interface for engaging with a translation.

As noted above, different translations may be presented, or surfaced, to different groups of users, and the users may engage with the translation in different ways. FIG. 4 is an example of a user interface for engaging with a translation.

A user's device, such as a mobile device may include a display area 76. The display area 76 may display an interface for an application, such as a social networking application. Among other possibilities, the display area 76 may include a display of a news feed 78 showing recent activity on the social network which the social network has determined may be of interest to an active user.

For example, the news feed depicted in FIG. 4 shows a recent post 80 that the current user's friend has recently written. The post 80 is surfaced to the current user in the user's newsfeed. The post 80 may include translated information. For example, the posting user may have written the original post in English, but the post 80 appearing in the news feed 78 may appear in Spanish. This may occur for a number of reasons. The social network may have identified that the current user is a Spanish speaker (e.g., through user-defined language preferences or by auto-detecting the language used by the current user). In this case, the social network may automatically translate non-Spanish posts into Spanish for the current user. In other embodiments, the post 80 may originally appear in the native language in which it was written, and an option may be presented for translating the post into a destination language.

The current user can engage with the post in a number of ways. For example, a "like" button 82 is associated with the post. By interacting with the like button 82, the current user indicates their approval of the post 82 (typically, interacting with the "like" button would increase the count of "likes" displayed in connection with the post 80 and show other users that the current user had liked the post 80).

The user may also interact with a share button 84. Interacting with the share button 84 causes the post 80 to be distributed to one or more destinations identified by the current user. For example, the current user may select a group of people to whom the post should be sent, or may cause the post to appear 80 on the current user's own collection of postings.

Moreover, the user may comment on the post through a comments field 86. If the user has the appropriate permissions, commenting on the post 80 will cause the text entered in the comments field 86 to appear in connection with the post 80.

Although several specific ways of interacting with the post 80 have been described, one of ordinary skill in the art will recognize that there may be other ways to interact with translated material.

As shown in FIG. 4, it is not necessary to indicate to the user that the post 80 is a machine-generated translation. Nonetheless, in some embodiments, the display area 76 may include an indication that the post 80 is a translation, and an option may be presented allowing the user to indicate if the translation is understandable or useable. This information may also be recorded as part of the user engagement metrics.

Figure 5:
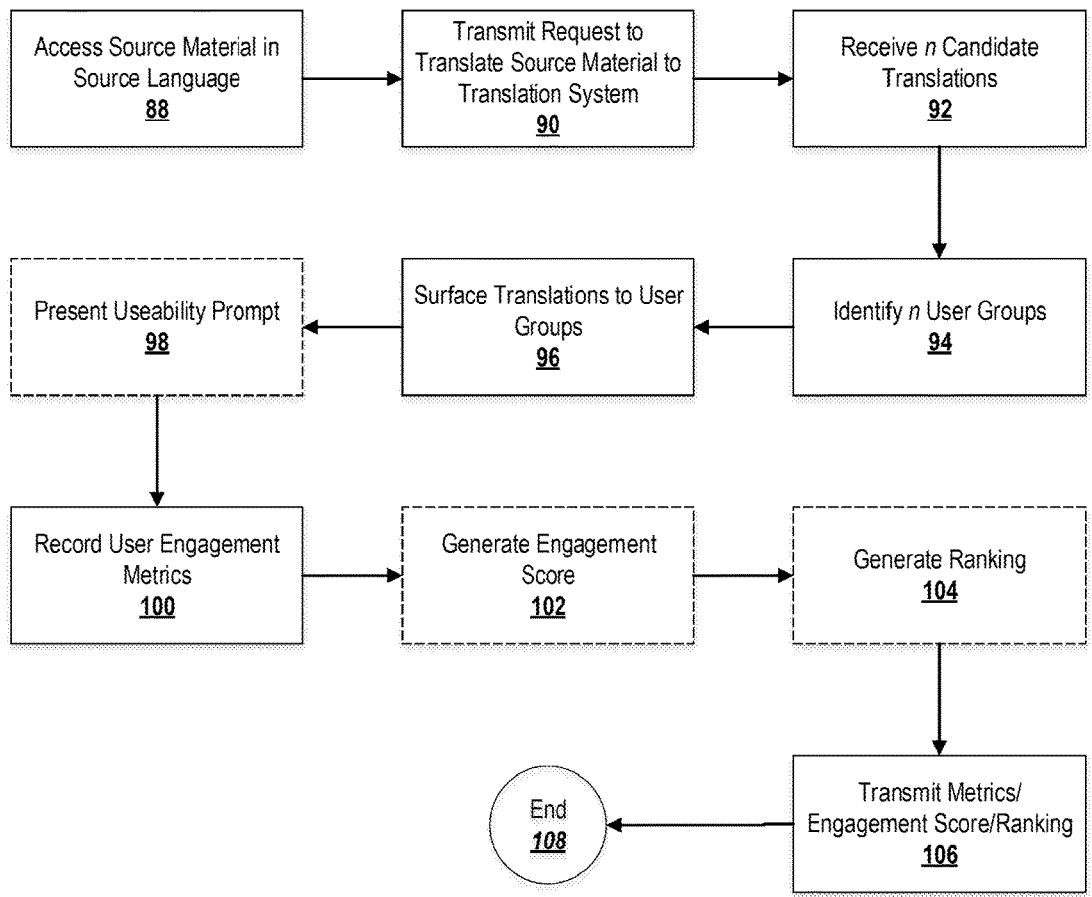
FIG. 5 is a flowchart depicting an exemplary process for measuring user engagement.

The interface depicted in FIG. 4 may be employed in connection with a social network for measuring user engagement. FIG. 5 depicts an exemplary process for measuring user engagement.

At step 88, a social networking service may access source material in a source language $L_a$. For example, the source material may be a user's post, an article or publication, a web page, or any other material written in the source language. Among other possibilities, the social networking service may receive a request to translate the source material into a destination language.

At step 90, the social networking service may transmit a request to a translation system to translate the source material into the destination language. The destination language may be indicated in the original request to translate the source material received by the social networking service, or may be determined automatically by the social networking service (e.g., based on user preferences or an automatically determined language of the user).

At step 92, the social networking service may receive n candidate translations in response to the request sent at step 90. The social networking service may identify a corresponding n user groups at step 94. The n user groups may be made up of a random sampling of users that are likely to be interested in the source material, or may include a non-random selection of users (e.g., to ensure a diversity of demographic groups, or to test different translations within a given demographic group). In some embodiments, the n user groups may not be identified immediately, but rather the social networking service may wait to receive requests for the translated source material. As each request is received, the social networking service may provide a different translation, e.g. in round-robin fashion or by providing a random translation candidate.

At step 96, the social networking service may surface the translations to the users in the user groups identified in step 94. For example, the translations may be provided to a user's news feed, may appear in a banner or advertisement, or otherwise may be made available to the user. Optionally, at step 98, the social networking service may present a useability prompt along with the translation asking the user whether the translation is useable or understandable.

At step 100, the social networking service may record user engagement metrics each time that one of the users of the n user groups interacts with the translation. This may include actions such as liking, sharing, or commenting on the translation.

Optionally, at step 102 the social networking service may calculate an engagement score based on the metrics recorded at step 100. For example, after the candidate translation has been exposed for a predetermined period of time, the social networking service may add up the number of likes, shares, and comments, may weigh the different categories of engagement types based on a relative importance of the categories, and may normalize the result. This result may be an engagement score that represents how much, how often, or how deeply users interacted with the candidate translation. The engagement score may be normalized so that it may be compared to the engagement scores of the other candidate translations.

Optionally, at step 104 the social networking service may generate a ranking of the candidate translations based on the amount or depth of interactions that the users had with the candidate translations.

It is noted that steps 102 and 104 need not necessarily be performed by the social networking service. For example, the metrics could be sent directly to a translation system 10 or third-party service and engagement scores or rankings could be calculated there.

It is further noted that the metrics, engagement scores, and rankings need not be calculated based on user-by-user data. In some circumstances, it may be possible to calculate these scores, for example, on a translation-by-translation basis. For example, different candidate translations may be stored at different locations and accessed by different links or uniform resource locators (URLs). The social network may count the number of times that the link or URL is accessed for each candidate translation, which may serve as a proxy for user engagement.

At step 106, the social networking service may transmit the metrics, engagement score, and/or ranking to the translation system 10. Processing may then end at step 108.

Network Embodiments

Figure 6:
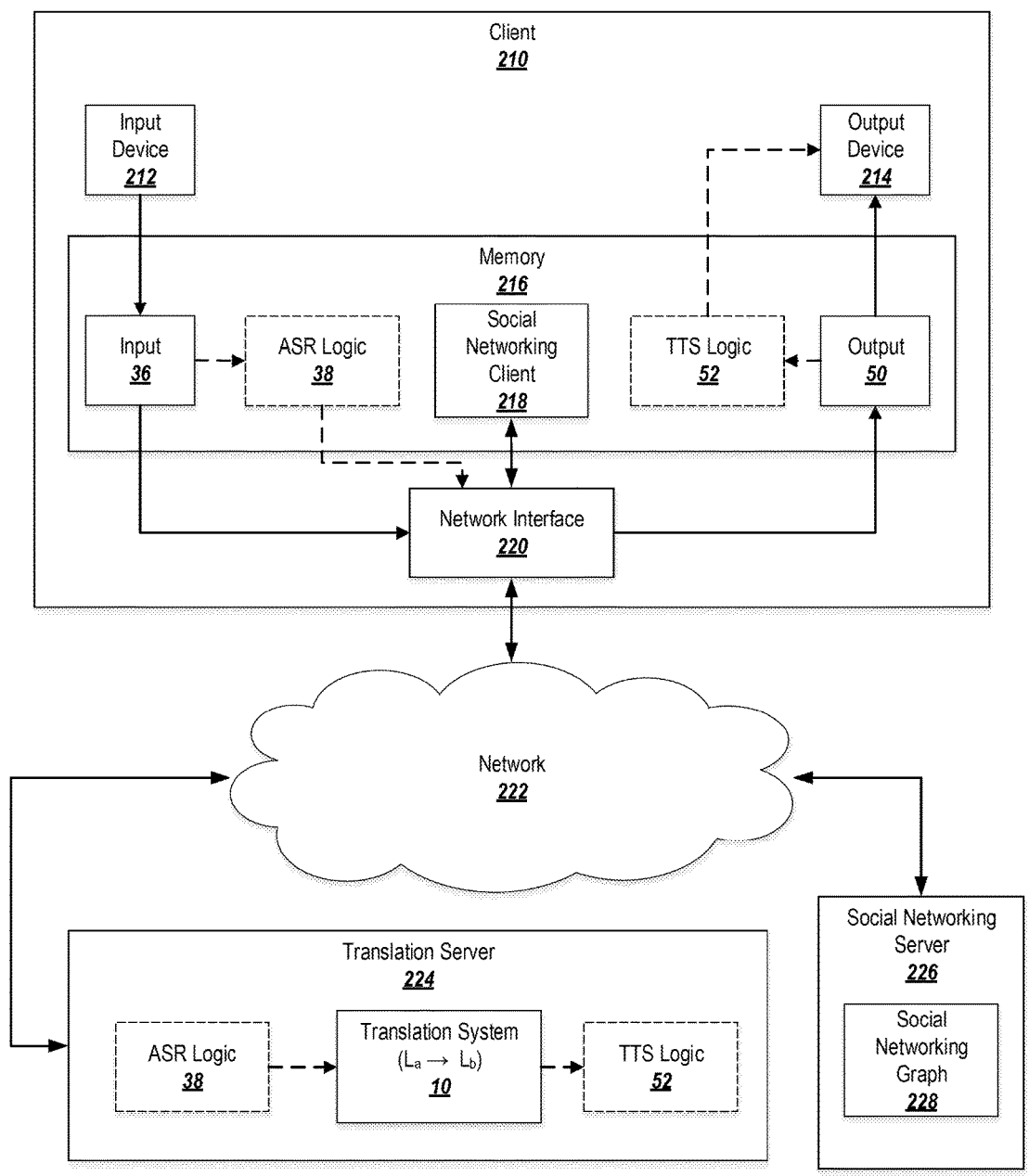
FIG. 6 depicts an exemplary network embodiment.

Some exemplary embodiments may be employed in a network environment, such as the environment depicted in FIG. 6.

A user may interact with a client 210, which may be (for example) a personal computer, tablet, mobile phone, special-purpose translation device, etc. In some embodiments, the client 210 does not require interaction from a user.

The client 210 may include one or more input devices 212 and one or more output devices 214. The input devices 212 may include, for example, microphones, keyboards, cameras, electronic pens, touch screens, and other devices for receiving an input in a source language $L_a$. The output devices 214 may include a speaker, a display device such as a monitor or touch screen, and other devices for presenting an output in a destination language $L_b$.

In some embodiments, the input from the input devices 212 may be in the form of an input 36 that is being sent to a translation system 10 for translation. In other embodiments, the client 210 may also submit training data, a phrase table, a translation, or a translation and the original source data used to generate the translation.

The client 210 may include a memory 216, which may be a non-transitory computer readable storage medium, such as one or a combination of a hard drive, solid state drive, flash storage, read only memory, or random access memory. The memory 216 may a representation of an input 36 and/or a representation of an output 50, as well as one or more applications. For example, the memory 216 may store a social networking client 218 that allows a user to interact with a social networking service.

The input 36 may be textual, such as in the case where the input device 212 is a keyboard. Alternatively, the input 36 may be an audio recording, such as in the case where the input device 212 is a microphone. Accordingly, the input 26 may be subjected to automatic speech recognition (ASR) logic 38 in order to transform the audio recording to text that is processable by the translation system 10. As shown in FIG. 6, the ASR logic 38 may be located at the client device 210 (so that the audio recording is processed locally by the client 210 and corresponding text is transmitted to the translation server 224), or may be located remotely at the translation server 224 (in which case, the audio recording may be transmitted to the translation server 224 and the translation server 224 may process the audio into text). Other combinations are also possible—for example, if the input device 212 is a touch pad or electronic pen, the input 36 may be in the form of handwriting, which may be subjected to handwriting or optical character recognition analysis logic in order to transform the input 36 into processable text.

Similarly, a resulting output 50 from a translation system 10 may be in the form of text. In some embodiments, the desirable end form of the output may be something other than text, such as an audio representation of the translation. Accordingly, the output 50 may be subjected to text-to-speech (TTS) logic 52 in order to transform the text into an audio recording that is presentable by the output devices 214. As shown in FIG. 6, the TTS logic 52 may be located at the client device 210 (so that the output text is processed locally by the client 210 and corresponding audio is sent to the output devices 214), or may be located remotely at the translation server 224 (in which case, text may be processed at the translation server 224 and the resulting audio recording may be transmitted to the client 210). Other combinations of processing logic are also possible, depending on the desired final form for the output 50.

The client 210 may be provided with a network interface 220 for communicating with a network 222, such as the Internet. The network interface 220 may transmit the input 10 in a format and/or using a protocol compatible with the network 222 and may receive a corresponding output 28 from the network 222.

The network interface 220 may communicate through the network 222 to a translation server 224. The translation server 224 may host the above-described translation system 10. The translation system 10 may translate the input 36 into an output 50.

The network interface 220 of the client 210 may also be used to communicate through the network 222 with a social networking server 226. The social networking server 226 may include or may interact with a social networking graph 228 that defines connections in a social network. Furthermore, the translation server 224 may connect to the social networking server 226 for various purposes, such as retrieving training data from the social network.

A user of the client 210 may be an individual (human user), an entity (e.g., an enterprise, business, or third-party application), or a group (e.g., of individuals or entities) that interacts or communicates with or over the social-networking server 226. The social-networking server 226 may be a network-addressable computing system hosting an online social network. The social-networking server 226 may generate, store, receive, and send social-networking data, such as, for example, user-profile data, concept-profile data, social-graph information, or other suitable data related to the online social network. The social-networking server 226 may be accessed by the other components of the network environment either directly or via the network 222.

The social-networking server 226 may include an authorization server (or other suitable component(s)) that allows users to opt in to or opt out of having their actions logged by social-networking server 226 or shared with other systems (e.g., third-party systems, such as the translation server 224), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 226 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 100 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social-networking system 226 may send a request to the data store for the object. The request may identify the user associated with the request. The requested data object may only be sent to the user (or a client system 210 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network that may benefit from the above-described translation system. Targeting criteria used to identify and target users may include explicit, stated user interests on social-networking server 226 or explicit connections of a user to a node, object, entity, brand, or page on social-networking server 226. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients; affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

Figure 7:
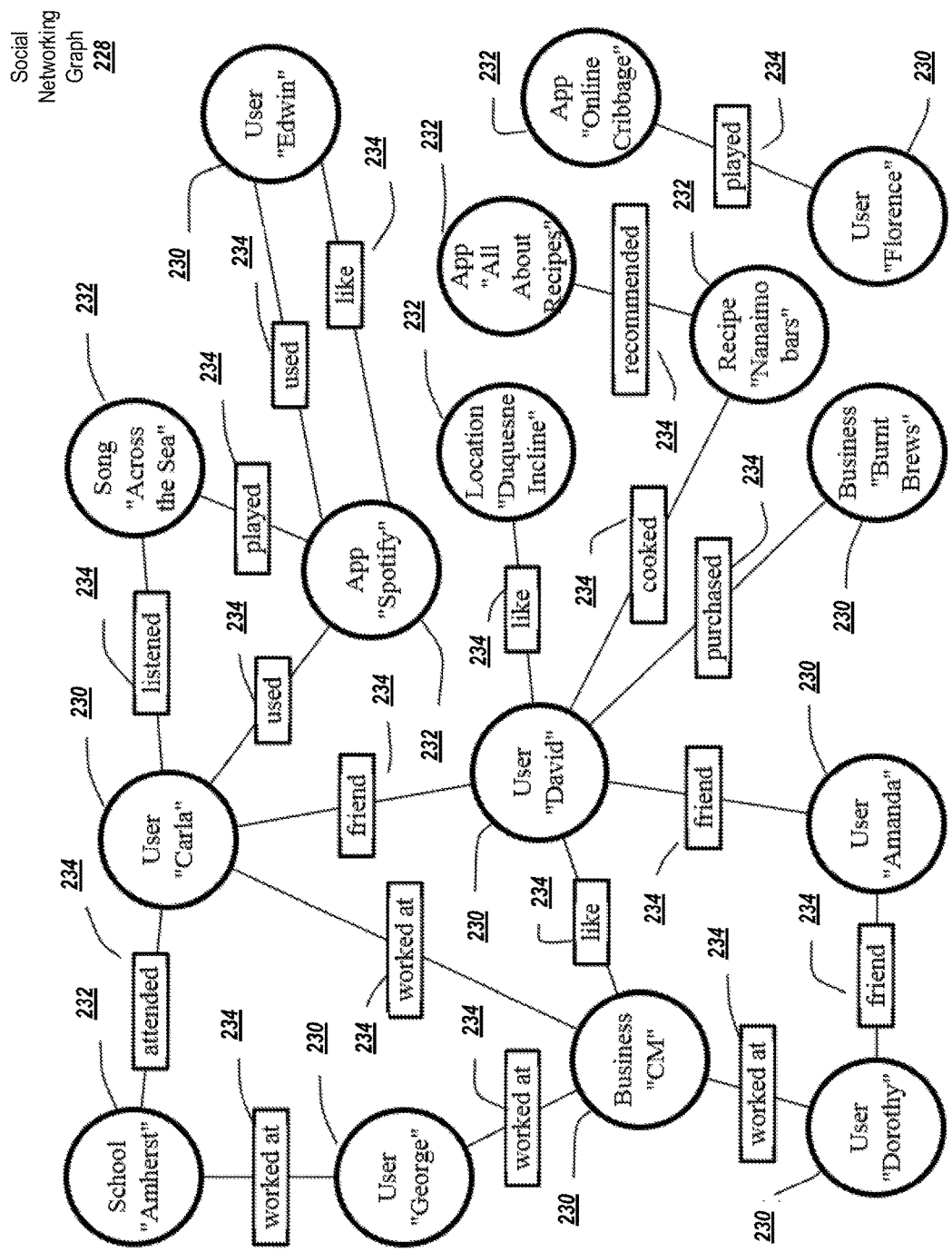
FIG. 7 describes the social networking graph depicted in FIG. 10 in more detail.

FIG. 7 illustrates an example of a social graph 228. In exemplary embodiments, a social-networking service may store one or more social graphs 228 in one or more data stores as a social graph data structure via the social networking service.

The social graph 228 may include multiple nodes, such as user nodes 230 and concept nodes 232. The social graph 228 may furthermore include edges 234 connecting the nodes. The nodes and edges of social graph 228 may be stored as data objects, for example, in a data store (such as a social-graph database). Such a data store may include one or more searchable or queryable indexes of nodes or edges of social graph 228.

The social graph 228 may be accessed by a social-networking server 226, client system 210, third-party system (e.g., the translation server 224), or any other approved system or device for suitable applications.

A user node 230 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 230 corresponding to the user, and store the user node 30 in one or more data stores. Users and user nodes 230 described herein may, where appropriate, refer to registered users and user nodes 230 associated with registered users. In addition or as an alternative, users and user nodes 230 described herein may, where appropriate, refer to users that have not registered with the social-networking system. In particular embodiments, a user node 230 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 230 may be associated with one or more data objects corresponding to information associated with a user. In particular embodiments, a user node 230 may correspond to one or more webpages. A user node 230 may be associated with a unique user identifier for the user in the social-networking system.

In particular embodiments, a concept node 232 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 232 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 232 may be associated with one or more data objects corresponding to information associated with concept node 232. In particular embodiments, a concept node 232 may correspond to one or more webpages.

In particular embodiments, a node in social graph 228 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 232. Profile pages may be viewable by all or a selected subset of other users. As an example and not by way of limitation, a user node 230 may have a corresponding user-profile page in which the corresponding user may add content, make declarations, or otherwise express himself or herself. A business page such as business page 205 may comprise a user-profile page for a commerce entity. As another example and not by way of limitation, a concept node 232 may have a corresponding concept-profile page in which one or more users may add content, make declarations, or express themselves, particularly in relation to the concept corresponding to concept node 232.

In particular embodiments, a concept node 232 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 230 corresponding to the user and a concept node 232 corresponding to the third-party webpage or resource and store edge 234 in one or more data stores.

In particular embodiments, a pair of nodes in social graph 228 may be connected to each other by one or more edges 234. An edge 234 connecting a pair of nodes may represent a relationship between the pair of nodes. In particular embodiments, an edge 234 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 234 connecting the first user's user node 230 to the second user's user node 230 in social graph 228 and store edge 234 as social-graph information in one or more data stores. In the example of FIG. 7, social graph 228 includes an edge 234 indicating a friend relation between user nodes 230 of user "Amanda" and user "Dorothy." Although this disclosure describes or illustrates particular edges 234 with particular attributes connecting particular user nodes 230, this disclosure contemplates any suitable edges 234 with any suitable attributes connecting user nodes 230. As an example and not by way of limitation, an edge 234 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 228 by one or more edges 234.

In particular embodiments, an edge 234 between a user node 230 and a concept node 232 may represent a particular action or activity performed by a user associated with user node 230 toward a concept associated with a concept node 232. As an example and not by way of limitation, as illustrated in FIG. 7, a user may "like," "attended," "played," "listened," "cooked," "worked at," or "watched" a concept, each of which may correspond to a edge type or subtype. A concept-profile page corresponding to a concept node 232 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 234 and a "used" edge (as illustrated in FIG. 7) between user nodes 230 corresponding to the user and concept nodes 232 corresponding to the song and application to indicate that the user listened to the song and used the application. Moreover, the social-networking system may create a "played" edge 234 (as illustrated in FIG. 7) between concept nodes 232 corresponding to the song and the application to indicate that the particular song was played by the particular application. In this case, "played" edge 234 corresponds to an action performed by an external application (SPOTIFY) on an external audio file (the song "Across the Sea"). Although this disclosure describes particular edges 234 with particular attributes connecting user nodes 230 and concept nodes 232, this disclosure contemplates any suitable edges 234 with any suitable attributes connecting user nodes 230 and concept nodes 232. Moreover, although this disclosure describes edges between a user node 230 and a concept node 232 representing a single relationship, this disclosure contemplates edges between a user node 230 and a concept node 232 representing one or more relationships. As an example and not by way of limitation, an edge 234 may represent both that a user likes and has used at a particular concept. Alternatively, another edge 234 may represent each type of relationship (or multiples of a single relationship) between a user node 230 and a concept node 232 (as illustrated in FIG. 7 between user node 230 for user "Edwin" and concept node 232 for "SPOTIFY").

In particular embodiments, the social-networking system may create an edge 234 between a user node 230 and a concept node 232 in social graph 228. As an example and not by way of limitation, a user viewing a concept-profile page (such as, for example, by using a web browser or a special-purpose application hosted by the user's client system) may indicate that he or she likes the concept represented by the concept node 232 by clicking or selecting a "Like" icon, which may cause the user's client system to send to the social-networking system a message indicating the user's liking of the concept associated with the concept-profile page. In response to the message, the social-networking system may create an edge 234 between user node 230 associated with the user and concept node 232, as illustrated by "like" edge 234 between the user and concept node 232. In particular embodiments, the social-networking system may store an edge 234 in one or more data stores. In particular embodiments, an edge 234 may be automatically formed by the social-networking system in response to a particular user action. As an example and not by way of limitation, if a first user uploads a picture, watches a movie, or listens to a song, an edge 234 may be formed between user node 230 corresponding to the first user and concept nodes 232 corresponding to those concepts. Although this disclosure describes forming particular edges 234 in particular manners, this disclosure contemplates forming any suitable edges 234 in any suitable manner.

The social graph 228 may further comprise a plurality of product nodes. Product nodes may represent particular products that may be associated with a particular business. A business may provide a product catalog to a consumer-to-business service and the consumer-to-business service may therefore represent each of the products within the product in the social graph 228 with each product being in a distinct product node. A product node may comprise information relating to the product, such as pricing information, descriptive information, manufacturer information, availability information, and other relevant information. For example, each of the items on a menu for a restaurant may be represented within the social graph 228 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 228. The information for a product node may be manipulated by the social-networking system as a product object that encapsulates information regarding the referenced product.

As such, the social graph 228 may be used to infer shared interests, shared experiences, or other shared or common attributes of two or more users of a social-networking system. For instance, two or more users each having an edge to a common business, product, media item, institution, or other entity represented in the social graph 228 may indicate a shared relationship with that entity, which may be used to suggest customization of a use of a social-networking system, including a messaging system, for one or more users.

Computer-Related Embodiments

Figure 8:
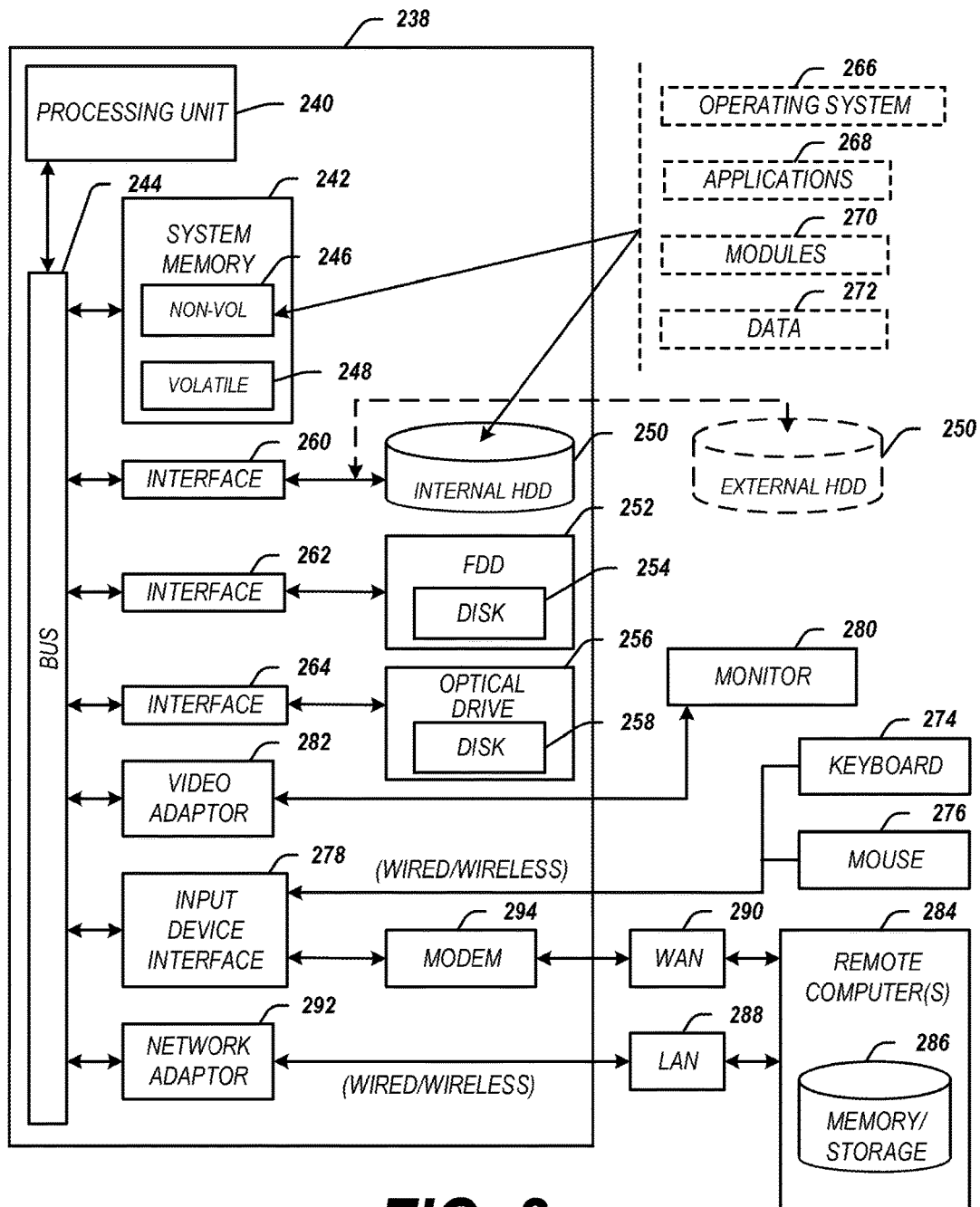
FIG. 8 depicts an exemplary computing device suitable for use with exemplary embodiments.

The above-described methods may be embodied as instructions on a computer readable medium or as part of a computing architecture. FIG. 8 illustrates an embodiment of an exemplary computing architecture 236 suitable for implementing various embodiments as previously described. In one embodiment, the computing architecture 236 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 236. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 236 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 236.

As shown in FIG. 8, the computing architecture 236 comprises a processing unit 240, a system memory 242 and a system bus 244. The processing unit 240 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 240.

The system bus 244 provides an interface for system components including, but not limited to, the system memory 242 to the processing unit 240. The system bus 244 can be any of several types of bus structure that may further interconnect to a memory bus (with or without a memory controller), a peripheral bus, and a local bus using any of a variety of commercially available bus architectures. Interface adapters may connect to the system bus 244 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 236 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 242 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 242 can include non-volatile memory 246 and/or volatile memory 248. A basic input/output system (BIOS) can be stored in the non-volatile memory 246.

The computer 238 may include various types of computer-readable storage media in the form of one or more lower speed memory units, including an internal (or external) hard disk drive (HDD) 250, a magnetic floppy disk drive (FDD) 252 to read from or write to a removable magnetic disk 254, and an optical disk drive 256 to read from or write to a removable optical disk 258 (e.g., a CD-ROM or DVD). The HDD 250, FDD 252 and optical disk drive 256 can be connected to the system bus 244 by a HDD interface 260, an FDD interface 262 and an optical drive interface 264, respectively. The HDD interface 260 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 246, 248, including an operating system 266, one or more application programs 268, other program modules 270, and program data 272. In one embodiment, the one or more application programs 268, other program modules 270, and program data 272 can include, for example, the various applications and/or components of the system 30.

A user can enter commands and information into the computer 238 through one or more wire/wireless input devices, for example, a keyboard 274 and a pointing device, such as a mouse 276. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 278 that is coupled to the system bus 244, but can be connected by other interfaces such as a parallel port, IEEE 694 serial port, a game port, a USB port, an IR interface, and so forth.

A monitor 280 or other type of display device is also connected to the system bus 244 via an interface, such as a video adaptor 282. The monitor 280 may be internal or external to the computer 238. In addition to the monitor 280, a computer typically includes other peripheral output devices, such as speakers, printers, and so forth.

The computer 238 may operate in a networked environment using logical connections via wire and/or wireless communications to one or more remote computers, such as a remote computer 284. The remote computer 284 can be a workstation, a server computer, a router, a personal computer, portable computer, microprocessor-based entertainment appliance, a peer device or other common network node, and typically includes many or all of the elements described relative to the computer 238, although, for purposes of brevity, only a memory/storage device 286 is illustrated. The logical connections depicted include wire/wireless connectivity to a local area network (LAN) 288 and/or larger networks, for example, a wide area network (WAN) 290. Such LAN and WAN networking environments are commonplace in offices and companies, and facilitate enterprise-wide computer networks, such as intranets, all of which may connect to a global communications network, for example, the Internet.

When used in a LAN networking environment, the computer 238 is connected to the LAN 288 through a wire and/or wireless communication network interface or adaptor 292. The adaptor 292 can facilitate wire and/or wireless communications to the LAN 288, which may also include a wireless access point disposed thereon for communicating with the wireless functionality of the adaptor 292.

When used in a WAN networking environment, the computer 238 can include a modem 294, or is connected to a communications server on the WAN 290, or has other means for establishing communications over the WAN 290, such as by way of the Internet. The modem 294, which can be internal or external and a wire and/or wireless device, connects to the system bus 244 via the input device interface 278. In a networked environment, program modules depicted relative to the computer 238, or portions thereof, can be stored in the remote memory/storage device 286. It will be appreciated that the network connections shown are exemplary and other means of establishing a communications link between the computers can be used.

The computer 238 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
   (a) identifying a first machine-generated candidate translation and a second machine-generated candidate translation for a source text, the first machine-generated translation and second machine-generated translation differing from each other and being provided to different groups of users;
   (b) receiving one or more indications of engagement with the first machine-generated candidate translation and the second machine-generated candidate translation, wherein engagement with the first translation and engagement with the second translation are measured based on at least one of: a number of times that the respective translations are liked on a social network, a number of times that the respective translations are shared on the social network, a number of comments written with respect to the respective translations, or a number of times that a link associated with the respective translation is followed;
   (c) determining, based on the one or more indications of engagement, that the first candidate translation was favored over the second candidate translation, the determining comprising accessing a first engagement score for the first candidate translation based on the one or more indications of engagement, accessing a second engagement score for the second candidate translation based on the one or more indications of engagement, and comparing the first engagement score to the second engagement score; and (d) transmitting an indication that the first machine-generated candidate translation was favored over the second machine-generated candidate translation to a machine translation system used to generate the first machine-generated candidate translation and the second machine-generated candidate translation in favor of the first candidate translation.

2. The method of claim 1, wherein operation (b) comprises surfacing the first candidate translation to the first group of users on a social network, and surfacing the second candidate translation to the second group of users on the social network.

3. The method of claim 1, wherein engagement with the first translation and engagement with the second translation are measured by querying the first group of users and the second group of users as to whether the respective translations are understandable or useable.

4. The method of claim 1, further comprising modifying the machine translation system used to generate the first machine-generated candidate translation and the second machine-generated candidate translation in favor of the first candidate translation.

5. The method of claim 4, wherein the machine translation system comprises a translation model that generates one or more destination language hypotheses for source language input material based on a translation model parameter, and operation modifying the machine translation system comprises modifying the translation model parameter.

6. The method of claim 1, wherein the translation system comprises a language model that selects between two or more destination language hypotheses for source language input material based on a language model parameter, and modifying the machine translation system comprises modifying the language model parameter.

7. The method of claim 1, further comprising repeating operation (a)-(d) using the modified machine translation system to further tune the machine translation system.

8. A non-transitory computer-readable medium storing instructions that, when executed by one or more processors, cause the one or more processors to:

(a) identify a first machine-generated candidate translation and a second machine-generated candidate translation for a source text, the first machine-generated candidate translation and second machine-generated candidate translation differing from each other and being provided to different groups of users;

(b) receive one or more indications of engagement with the first machine-generated candidate translation and the second machine-generated candidate translation, wherein engagement with the first translation and engagement with the second translation are measured based on at least one of: a number of times that the respective translations are liked on a social network, a number of times that the respective translations are shared on the social network, a number of comments written with respect to the respective translations, or a number of times that a link associated with the respective translation is followed;

(c) determine, based on the one or more indications of engagement, that the first candidate translation was favored over the second candidate translation the determining comprising accessing a first engagement score for the first candidate translation based on the one or more indications of engagement, accessing a second engagement score for the second candidate translation based on the one or more indications of engagement, and comparing the first engagement score to the second engagement score; and (d) transmit an indication that the first machine-generated candidate translation was favored over the second machine-generated candidate translation to a machine translation system used to generate the first machine-generated candidate translation and the second machine-generated candidate translation in favor of the first candidate translation.

9. The medium of claim 8, wherein operation (b) comprises surfacing the first candidate translation to the first group of users on a social network and surfacing the second candidate translation to the second group of users on the social network.

10. The medium of claim 8, wherein engagement with the first translation and engagement with the second translation are measured by querying the first group of users and the second group of users as to whether the respective translations are understandable or useable.

11. The medium of claim 8, further storing instructions for modifying the machine translation system used to generate the first machine-generated candidate translation and the second machine-generated candidate translation in favor of the first candidate translation.

12. The medium of claim 11, wherein the translation system comprises a translation model that generates one or more destination language hypotheses for source language input material based on a translation model parameter, and modifying the machine translation system comprises modifying the translation model parameter.

13. The medium of claim 11, wherein the translation system comprises a language model that selects between two or more destination language hypotheses for source language input material based on a language model parameter, and modifying the machine translation system comprises modifying the language model parameter.

14. The medium of claim 8, further storing instructions for repeating operations (a)-(d) using the modified machine translation system to further tune the machine translation system.

15. An apparatus comprising:

a non-transitory computer-readable medium configured to store one or more models used by a machine translation system;

a processor configured to:

(a) identify a first machine-generated candidate translation and a second machine-generated candidate translation for a source text, the first machine-generated candidate translation and second machine-generated candidate translation differing from each other and being provided to different groups of users;

(b) receive one or more indications of engagement with the first machine-generated candidate translation and the second machine-generated candidate translation, wherein engagement with the first translation and engagement with the second translation are measured based on at least one of: a number of times that the respective translations are liked on a social network, a number of times that the respective translations are shared on the social network, a number of comments written with respect to the respective translations, or a number of times that a link associated with the respective translation is followed;
(c) determine, based on the one or more indications of engagement, that the first candidate translation was favored over the second candidate translation, the determining comprising accessing a first engagement score for the first candidate translation based on the one or more indications of engagement, accessing a second engagement score for the second candidate translation based on the one or more indications of engagement, and comparing the first engagement score to the second engagement score; and
(d) transmit an indication that the first machine-generated candidate translation was favored over the second machine-generated candidate translation to a machine translation system used to generate the first machine-generated candidate translation and the second machine-generated candidate translation in favor of the first candidate translation.

16. The apparatus of claim 15, wherein operation (b) comprises surfacing the first candidate translation to the first group of users on a social network and surfacing the second candidate translation to the second group of users on the social network.

17. The apparatus of claim 15, wherein engagement with the first translation and engagement with the second translation are measured by querying the first group of users and the second group of users as to whether the respective translations are understandable or useable.

18. The apparatus of claim 15, wherein the processor is further configured to modify the machine translation system used to generate the first machine-generated candidate translation and the second machine-generated candidate translation in favor of the first candidate translation.

19. The apparatus of claim 18, wherein the machine translation system comprises a translation model that generates one or more destination language hypotheses for source language input material based on a translation model parameter, and modifying the machine translation system comprises modifying the translation model parameter.

20. The apparatus of claim 18, wherein the translation system comprises a language model that selects between two or more destination language hypotheses for source language input material based on a language model parameter, and modifying the machine translation system comprises modifying the language model parameter.

\* \* \* \* \*